(12) United States Patent
Graichen et al.

(10) Patent No.: US 10,132,424 B2
(45) Date of Patent: Nov. 20, 2018

(54) VARIABLE FLOW VALVE HAVING METERED FLOW ORIFICE

(71) Applicants: Brian M. Graichen, Leonard, MI (US);
David E. Fletcher, Flint, MI (US);
James H. Miller, Ortonville, MI (US);
Keith Hampton, Ann Arbor, MI (US)

(72) Inventors: Brian M. Graichen, Leonard, MI (US);
David E. Fletcher, Flint, MI (US);
James H. Miller, Ortonville, MI (US);
Keith Hampton, Ann Arbor, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 228 days.

(21) Appl. No.: 15/010,393

(22) Filed: Jan. 29, 2016

(65) Prior Publication Data
US 2016/0146374 A1    May 26, 2016

Related U.S. Application Data

(63) Continuation of application No. 14/269,286, filed on May 5, 2014, now Pat. No. 9,291,094.

(51) Int. Cl.
*F02D 23/00* (2006.01)
*F16K 37/00* (2006.01)
(Continued)

(52) U.S. Cl.
CPC .......... *F16K 37/0041* (2013.01); *F02B 37/16* (2013.01); *F02B 37/183* (2013.01);
(Continued)

(58) Field of Classification Search
CPC .. F02B 2039/168; F02B 37/16; F02B 37/183; F02B 37/186; F02D 9/12; F16K 31/0648;
(Continued)

(56) References Cited

U.S. PATENT DOCUMENTS

| 1,128,077 A | 2/1915 | Taylor |
| 1,805,106 A | 5/1931 | Robinson |
| (Continued) | | |

FOREIGN PATENT DOCUMENTS

| DE | 10 2010 024 297 | 12/2011 |
| EP | 0 827 056 | 3/1998 |
| (Continued) | | |

OTHER PUBLICATIONS

JP2006177303 translation, Yoneda Yukifumi.*
(Continued)

*Primary Examiner* — Jesse Bogue
(74) *Attorney, Agent, or Firm* — FisherBroyles, LLP; Susan M. Oiler

(57) ABSTRACT

A variable flow valve assembly is disclosed, and includes a main body, a piston, a position sensor, a controller, a solenoid, and a cover. The main body defines a chamber, an inlet port, an outlet port, and a wall located between the inlet port and the outlet port. The wall defines a metering orifice for selectively allowing a medium to flow from the inlet port to the outlet port. The chamber of the main body includes a pressurized chamber. The piston is moveable within the chamber of the main body in a plurality of partially open positions to vary the amount of medium flowing through the modulation orifice. The piston separates the pressurized chamber from the inlet port. The position sensor determines the position of the piston within the chamber of the main body, and the controller is in signal communication with the position sensor.

18 Claims, 6 Drawing Sheets

(51) Int. Cl.
  *F02B 37/16* (2006.01)
  *F02B 37/18* (2006.01)
  *F16K 31/122* (2006.01)
  *F16K 31/124* (2006.01)
  *F16K 3/24* (2006.01)
  *F02D 9/12* (2006.01)
  *F16K 31/06* (2006.01)
  *G05D 7/06* (2006.01)
  *F02B 39/16* (2006.01)

(52) U.S. Cl.
  CPC .............. *F02B 37/186* (2013.01); *F02D 9/12* (2013.01); *F16K 3/24* (2013.01); *F16K 31/0648* (2013.01); *F16K 31/124* (2013.01); *F16K 31/1223* (2013.01); *G05D 7/0635* (2013.01); *F02B 2039/168* (2013.01); *Y02T 10/144* (2013.01)

(58) Field of Classification Search
  CPC .............. F16K 31/1223; F16K 31/124; F16K 37/0041; F16K 3/24; G05D 7/0635; Y02T 10/144
  See application file for complete search history.

(56) References Cited

U.S. PATENT DOCUMENTS

| | | | |
|---|---|---|---|
| 3,425,444 A * | 2/1969 | Jones | F16K 17/0433 137/469 |
| 3,765,447 A | 10/1973 | Cornell | |
| 3,973,729 A | 8/1976 | Sliger | |
| RE32,197 E | 7/1986 | Self | |
| 4,671,123 A | 6/1987 | Magnussen, Jr. et al. | |
| 4,798,365 A | 1/1989 | Mayhew | |
| 5,150,734 A | 9/1992 | Chiba | |
| 5,393,035 A | 2/1995 | Steele | |
| 5,462,343 A | 10/1995 | Yoshida et al. | |
| 5,632,258 A | 5/1997 | Tsuzuki et al. | |
| 5,669,364 A | 9/1997 | Everingham | |
| 5,960,824 A | 10/1999 | Sullivan | |
| 6,006,732 A | 12/1999 | Oleksiewicz | |
| 6,019,347 A | 2/2000 | Adams et al. | |
| 6,089,019 A | 7/2000 | Roby | |
| 6,293,514 B1 | 9/2001 | Pechoux et al. | |
| 6,299,134 B1 | 10/2001 | Laaja | |
| 6,318,085 B1 | 11/2001 | Torno et al. | |
| 6,422,217 B1 | 7/2002 | Feucht et al. | |
| 6,435,848 B1 | 8/2002 | Minami et al. | |
| 6,607,175 B1 | 8/2003 | Nguyen et al. | |
| 6,722,128 B1 * | 4/2004 | Adrian | F02B 37/12 123/564 |
| 6,863,260 B2 | 3/2005 | Medina | |
| 6,938,420 B2 | 9/2005 | Kawamura et al. | |
| 7,100,584 B1 | 9/2006 | Bruestle et al. | |
| 7,481,056 B2 | 1/2009 | Blaylock et al. | |
| 7,500,363 B2 | 3/2009 | Hara et al. | |
| 7,617,678 B2 | 11/2009 | Joergl et al. | |
| 7,802,588 B2 | 9/2010 | Doutt | |
| 8,469,333 B2 | 6/2013 | Medina | |
| 8,671,976 B2 | 3/2014 | Park et al. | |
| 9,261,015 B2 | 2/2016 | Zurke et al. | |
| 2003/0042450 A1 | 3/2003 | Bircann | |
| 2003/0106539 A1 * | 6/2003 | Jung | F02B 37/16 123/559.1 |
| 2003/0145603 A1 | 8/2003 | Reed et al. | |
| 2004/0255580 A1 | 12/2004 | Bayerl | |
| 2006/0086918 A1 | 4/2006 | Koyama | |
| 2006/0272625 A1 | 12/2006 | Wang | |
| 2007/0227142 A1 | 10/2007 | Blaylock et al. | |
| 2008/0022679 A1 | 1/2008 | Hara et al. | |
| 2008/0066466 A1 * | 3/2008 | Melchior | F02B 37/007 60/600 |
| 2009/0101121 A1 | 4/2009 | Okamura | |
| 2009/0293963 A1 | 12/2009 | Busato et al. | |
| 2012/0132839 A1 | 5/2012 | Moren | |
| 2012/0198837 A1 | 8/2012 | Medina | |
| 2013/0319535 A1 | 12/2013 | Boger et al. | |
| 2013/0340428 A1 | 12/2013 | Graichen et al. | |
| 2014/0096675 A1 | 4/2014 | Fletcher et al. | |
| 2014/0271234 A1 | 9/2014 | Markyvech et al. | |
| 2015/0047340 A1 | 2/2015 | Ulrey et al. | |
| 2015/0059337 A1 * | 3/2015 | Wang | F02D 41/1401 60/602 |

FOREIGN PATENT DOCUMENTS

| | | |
|---|---|---|
| JP | 2004-76659 | 3/2004 |
| JP | 3911512 B2 | 5/2007 |
| JP | 2008-25529 | 2/2008 |
| WO | 2010/006150 | 1/2010 |
| WO | 2013192281 A2 | 12/2013 |

OTHER PUBLICATIONS

EP, Extended European Search Report; Application No. 13807817.5; (dated Jul. 6, 2016).
EP, Office Action; Patent Application No. 13807817.5; 3 pages (dated Mar. 7, 2017).
JP, Notice of Allowance issued in Japanese patent application No. 2015-518542 (dated Jun. 6, 2016).
PCT, International Search Report and Written Opinion, Patent Application No. PCT/US2013/046503 (dated Dec. 12, 2013).
U.S., Notice of Allowance, U.S. Appl. No. 13/921,473 (dated Mar. 16, 2015).
PCT, International Search Report and Written Opinion, Patent Application No. PCT/US2015/024037 (dated Jul. 7, 2015).
U.S., Non-Final Office Action, U.S. Appl. No. 14/269,286 (dated May 27, 2015).
U.S., Final Office Action, U.S. Appl. No. 14/269,286 (dated Oct. 8, 2015).
U.S., Advisory Action, U.S. Appl. No. 14/269,286 (dated Nov. 3, 2015).
U.S., Notice of Allowance, U.S. Appl. No. 14/269,286 (dated Dec. 8, 2015).
EP Supplement Search Report; Patent Application 15789807.3, 7 pages (Jan. 3, 2018).
CN, First Office Action with English Translation; Chinese Application No. 201580022093.0 (dated Jul. 16, 2018).

* cited by examiner

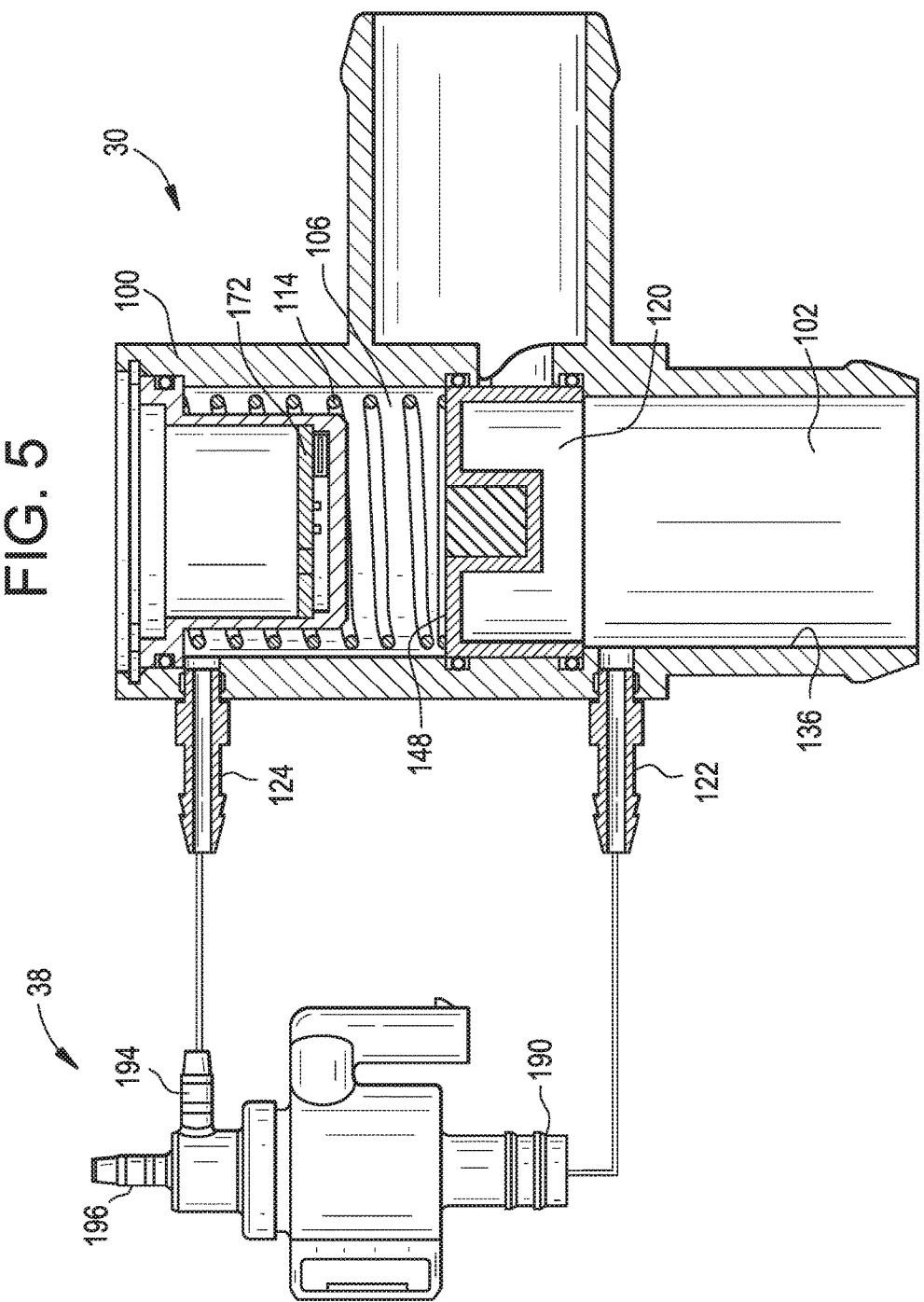

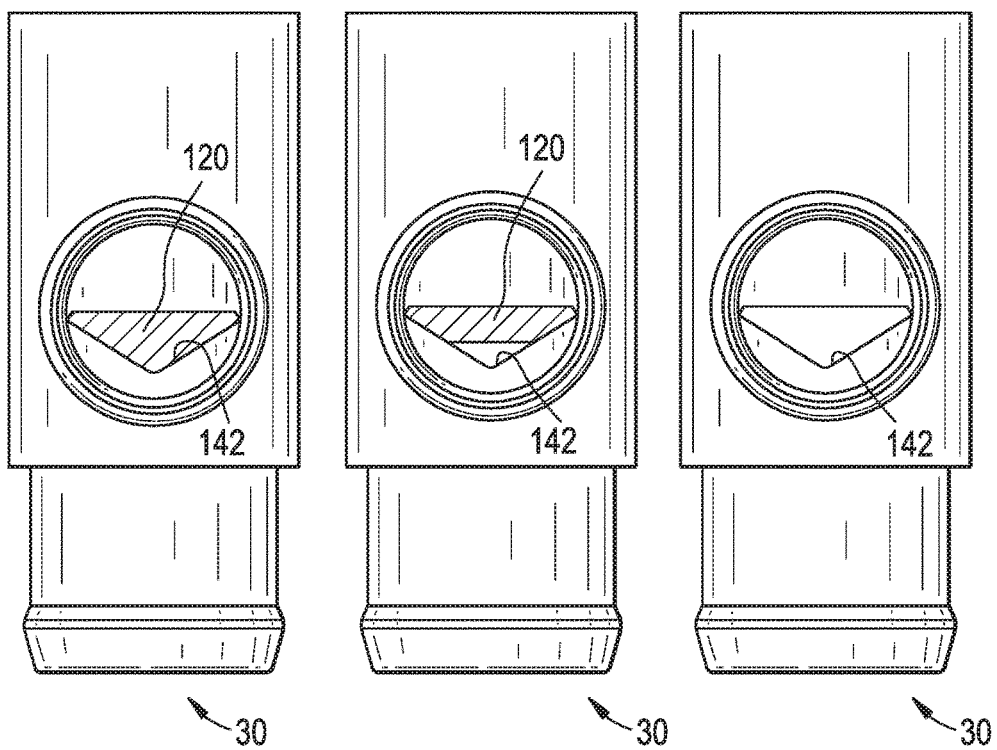

VARIABLE FLOW VALVE HAVING METERED FLOW ORIFICE

RELATED APPLICATIONS

This application is a continuation application of U.S. application Ser. No. 14/269,286, filed on May 5, 2014.

TECHNICAL FIELD

The present invention relates generally to a variable flow valve, where the valve includes a metering orifice for modulating the amount of flow.

BACKGROUND

Internal combustion engines may be used in a variety of applications such as, for example, passenger and industrial vehicles, marine, stationary and aerospace applications. There are generally two dominant ignition cycles, which are commonly referred to as gas and diesel cycles, or more formally as spark ignited (SI) and compression ignition (CI) cycles, respectively.

Exhaust-driven turbochargers may be used to improve the power output and overall efficiency of an internal combustion engine. Specifically, exhaust gas energy may be used to drive a turbine. The turbocharger includes a compressor and a turbine, where the compressor is mounted on a shaft of the turbocharger, opposite the turbine. The turbine converts engine exhaust gas into mechanical energy, which is used to drive the compressor. The compressor draws in and compresses air. The compressed air is then directed to an intake manifold of the internal combustion engine.

A relief valve, such as a compressor discharge valve or a blow-off valve, may be mounted on an intake pipe located downstream of the turbocharger before a throttle. Specifically, a compressor discharge valve may be used to vent compressed air back into an inlet of the compressor. A blow-off valve is similar to a compressor recirculation valve, but vents to the atmosphere rather than back to the inlet of the compressor. The relief valve may be used to alleviate a sudden surge or spike in pressure that may occur when the throttle closes (i.e., when an operator suddenly lifts his or her foot off of the gas pedal and the throttle closes). Some types of relief valves currently available may only be completely opened or shut. In other words, some relief valves do not provide active control of the position of the valve.

SUMMARY

The disclosed variable flow valve assembly includes a modulation orifice that varies the amount of medium, such as air or fluid, that flows through the relief valve. Specifically, in one aspect, a variable flow valve assembly is disclosed and includes a main body, a piston, a position sensor, a controller, a solenoid, and a cover. The main body defines a chamber, an inlet port, an outlet port, and a wall located between the inlet port and the outlet port. The wall defines a metering orifice for selectively allowing a medium to flow from the inlet port to the outlet port. The chamber of the main body includes a pressurized chamber. The piston is moveable within the chamber of the main body in a plurality of partially open positions to vary the amount of medium flowing through the modulation orifice. The piston separates the pressurized chamber from the inlet port. The position sensor determines the position of the piston within the chamber of the main body, and the controller is in signal communication with the position sensor. The solenoid is in signal communication with the controller. The cover is located within the chamber of the main body, and provides sealing between the pressurized chamber and the atmosphere.

In another aspect, a system for controlling an exhaust driven turbocharging system is disclosed. The system includes a turbocharger having a compressor inlet in fluid communication with a variable flow valve assembly and an intake manifold of an engine. The variable flow valve assembly includes a main body and a piston. The main body defines a chamber, an inlet port, an outlet port, and a wall located between the inlet port and the outlet port. The wall defines a metering orifice for selectively allowing a medium to flow from the inlet port to the outlet port. The chamber of the main body includes a pressurized chamber. The piston is moveable within the chamber of the main body in a plurality of partially open positions to vary the amount of medium flowing through the modulation orifice. The piston separates the pressurized chamber from the inlet port. The system also includes a position sensor, a controller, a solenoid, and a cover. The position sensor determines the position of the piston within the chamber of the main body. The controller is in signal communication with the position sensor. The position of the piston within the chamber is determined by the controller. The metering orifice is partially opened in order to communicate air into the intake manifold of the engine. The solenoid is in signal communication with the controller. The solenoid applies a predetermined amount of vacuum to the pressurized chamber. The predetermined amount of vacuum causes the piston to move into one of the plurality of open positions. The cover provides sealing between the pressurized chamber and the atmosphere.

BRIEF DESCRIPTION OF THE DRAWINGS

FIG. 5 is a cross-sectional view of the relief valve of FIG. 2 fluidly connected to a solenoid in the closed position.

FIG. 6A is a front view of the relief valve in the closed position.

FIG. 6B is a front view of the relief valve in a partially open position.

FIG. 6C is a front view of the relief valve in the open position.

DETAILED DESCRIPTION

Figure 1:
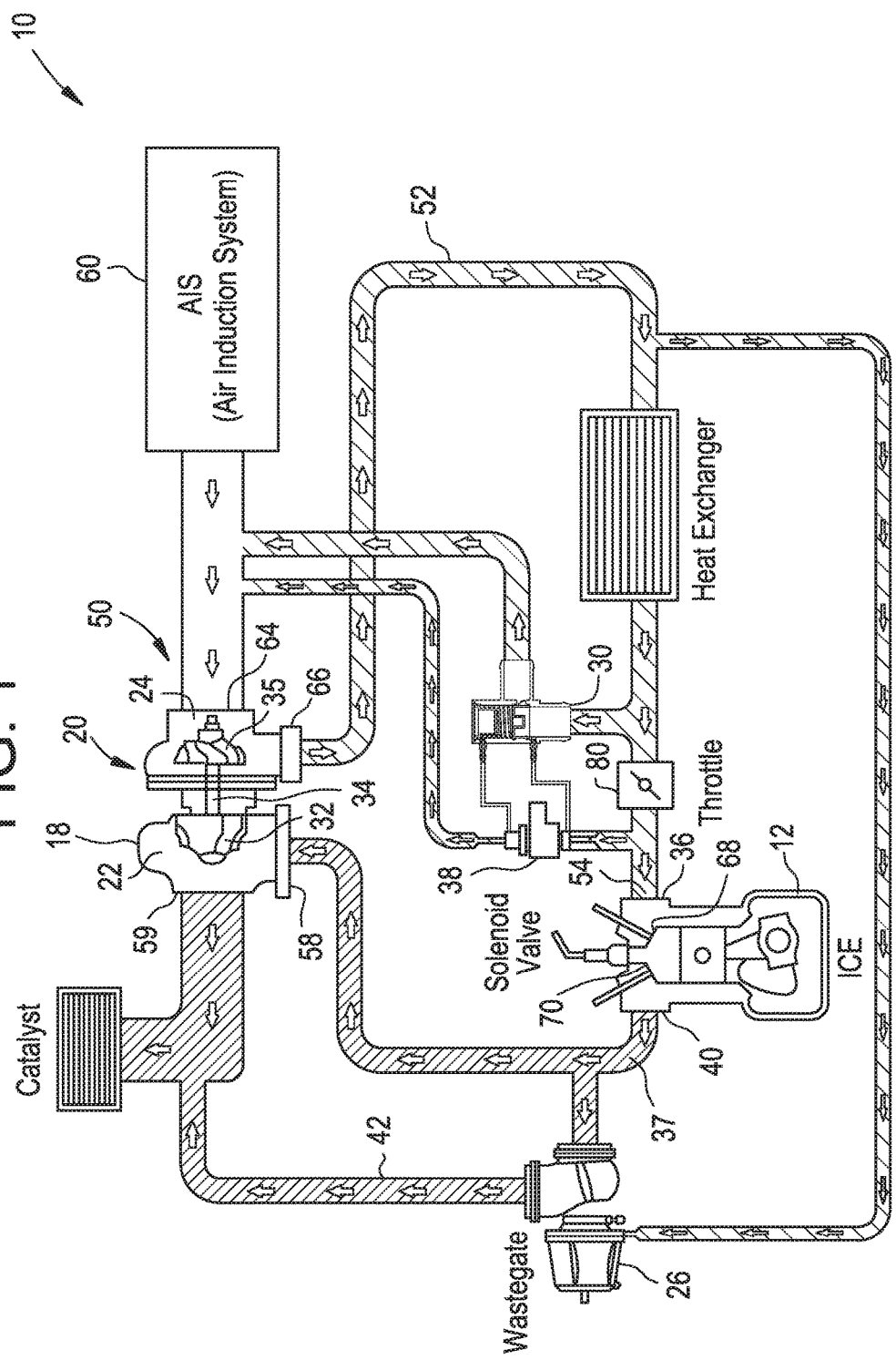
FIG. 1 is a diagram including flow paths and flow directions of one embodiment of an internal combustion engine turbo system that includes a relief valve.

The following detailed description will illustrate the general principles of the invention, examples of which are additionally illustrated in the accompanying drawings. In the drawings, like reference numbers indicate identical or functionally similar elements.

Referring now to FIG. 1, an exemplary schematic diagram of a turbo system 10 for an internal combustion engine 12 is illustrated. The turbo system 10 may include an exhaust-driven turbo charger ("EDT") 20 having a turbine section 22 and compressor section 24, a turbine bypass valve or wastegate 26, and a relief valve 30. An exhaust housing 18 of the EDT 20 contains a turbine wheel 32. A turbine wheel 32 harnesses and converts exhaust energy into mechanical work through a common shaft 34 to turn a compressor wheel 35. The compressor wheel 35 ingests, compresses and feeds air at elevated operating pressures into an intake manifold 36 of the internal combustion engine 12.

The wastegate 26 is a control valve used to meter an exhaust volume 37 exiting an exhaust manifold 40 of the internal combustion engine 12, and controls the amount of energy available to power the turbine wheel 32. The wastegate 26 works by opening a valve (not shown) connected to a bypass pipe 42. Opening the valve of the wastegate 26 allows for exhaust to flow away from the turbine wheel 32. Thus, the wastegate 26 may have direct control over the speed of the EDT 20 and the resultant operating pressure of the intake manifold 36 of the internal combustion engine 12. The wastegate 26 may have any number of embodiments, including the embodiments disclosed in applicant's U.S. Pat. No. 8,469,333, which is incorporated by reference herein in its entirety.

Operating pressures exist in an EDT compressor inlet 50, the intake manifold 36 of the internal combustion engine 12 and an intake manifold pipe 52, the exhaust manifold 40 of the internal combustion engine 12 and an intake manifold pipe 54, an exhaust inlet 58 of the EDT 20, and an exhaust outlet 59 of the EDT 20. Specifically, the EDT compressor inlet 50 may be defined as the passageway from an air intake system 60 to an inlet 64 of the compressor section 24. The intake manifold 36 of the internal combustion engine 12 may be defined as the passage between an EDT compressor discharge 66 and one or more intake valves 68 of the internal combustion engine 12. The exhaust manifold 40 of the internal combustion engine 12 may be defined as the passage between one or more exhaust valves 70 and the exhaust inlet 58 of the EDT. The exhaust may be any passageway located after the exhaust outlet 59 of the EDT 20. In order to achieve effective exhaust gas recirculation (EGR), the pressures in an exhaust manifold should be significantly higher than the pressures found in an intake manifold in order for exhaust gas to flow in the correct direction. Smaller EDT exhaust profiles produce higher desired exhaust manifold pressures, but at the expense of lower efficiencies. Thus, those skilled in the art will appreciate that a fine balance exists between achieving efficiency of the internal combustion engine 12 and EGR effectiveness.

The relief valve 30 may be a regulating valve located in the intake manifold pipe 52 between the compressor discharge 66 of the compressor section 24 of the EDT 20 and the intake manifold 36 of the internal combustion engine 12. In the embodiment as shown in FIG. 1, the relief valve 30 is a compressor recirculation valve that is fluidly connected to and vents compressed air back into the EDT compressor inlet 50. However, it should be noted that in another embodiment, the turbo system 10 may utilize a blow-off valve as well. A blow-off valve is similar to a compressor recirculation valve, but vents to the atmosphere rather than back to the compressor inlet of an EDT. A solenoid 38 may be connected to the relief valve 30. In one embodiment, the solenoid 38 may be used to apply vacuum to and actuate the relief valve 30, which is described in greater detail below.

In the exemplary embodiment as shown in FIG. 1, the relief valve 30 may be used with a spark ignited internal combustion engine 12 and a throttle plate 80. At any given operating range of the internal combustion engine 12, the shaft 34 of the EDT 20 may be spinning up to 200,000 revolutions per minute (RPM). A sudden closing of the throttle 80 does not immediately decelerate the RPM of the EDT 20. Therefore, this closing creates a sudden increase in pressure in the passages between the closed throttle 80 and EDT compressor section 24 (e.g., the intake manifold pipe 52). The relief valve 30 may be used to relieve or bypass the pressure created by the sudden closing of the throttle 80.

When the relief valve 30 is opened the EDT 20 may spin freely, thereby conserving the inertia of the EDT 20. If the relief valve 30 was omitted, the EDT 20 would stall or stop once the throttle 80 is closed. This stalling or stopping may adversely affect EDT life and throttle response. Those skilled in the art will appreciate that the EDT 20 should be spinning and ready to produce boost as soon as the throttle plate 80 is opened. The relief valve 30 may decrease turbo lag by allowing the EDT 20 to spin up to speed (i.e., spool up) without compressor load, as there is no back pressure present once the relief valve 30 is opened. A variable relief valve, which is described in greater detail below, may be especially beneficial by allowing just the amount of bypass to be ready for immediate boost to substantially prevent compressor surge. Compressor surge may be defined as when the air pressure after the compressor wheel 35 is actually higher than what the compressor wheel 35 is capable of maintaining. This condition causes the airflow in the compressor wheel 35 to back up, build pressure, or stall. Thus, compressor surge is noisy, affects EDT life, and may reduce the performance of the turbo system 10.

The relief valve 30 may be employed in any EDT enabled internal combustion engine, including a diesel engine. Although a turbo system 10 is disclosed, those skilled in the art will readily appreciate that the relief valve 30 may be used in any application where the flow of a medium such as fluid or gas may be modulated or varied. In other words, the relief valve 30 may include a plurality of partially opened positions to vary the amount of exhaust gas to the intake manifold 36 of the internal combustion engine 12 (FIG. 1).

Figure 2:
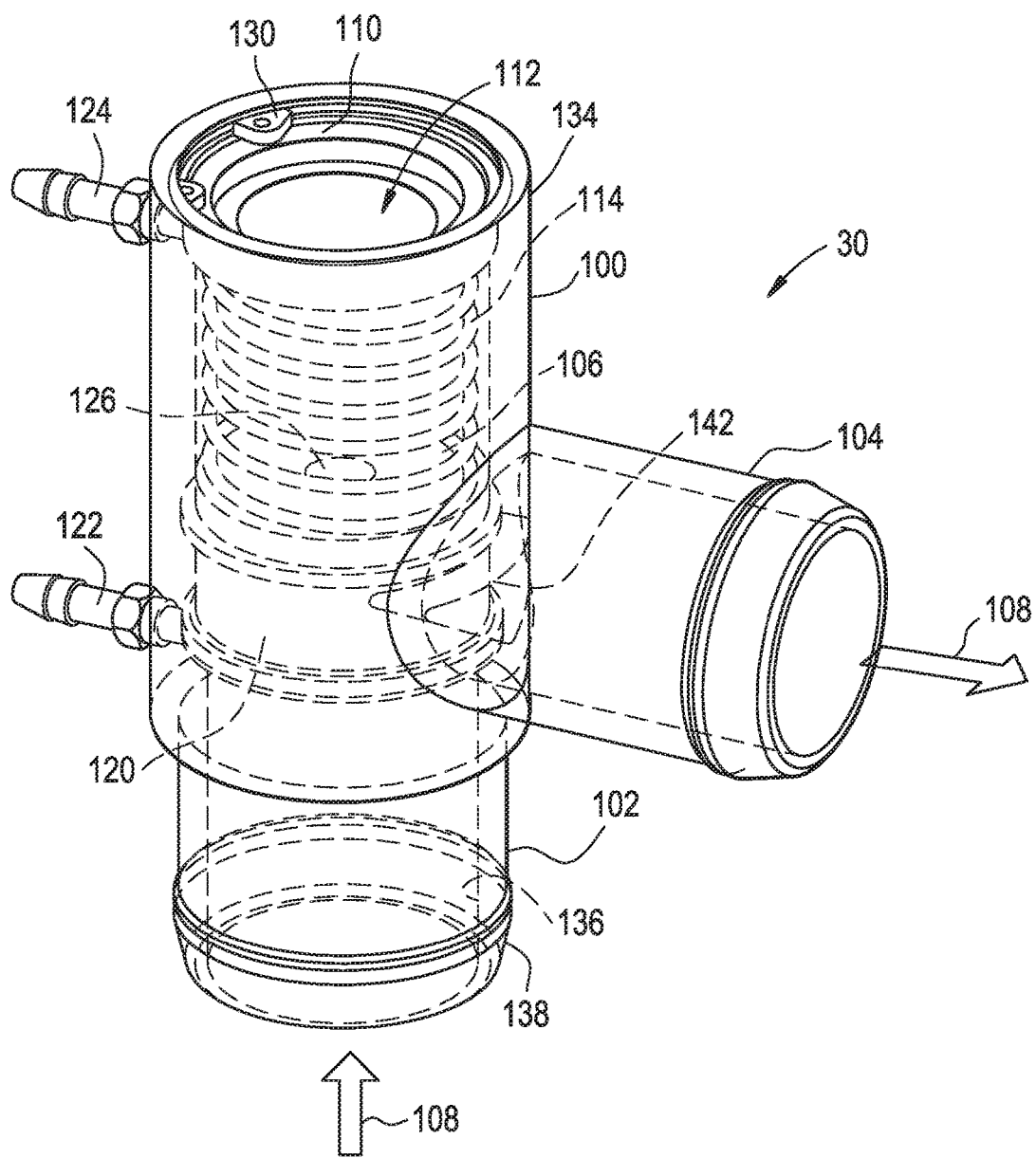
FIG. 2 is a perspective, partially transparent view of one embodiment of the relief valve in a closed position.
Figure 3:
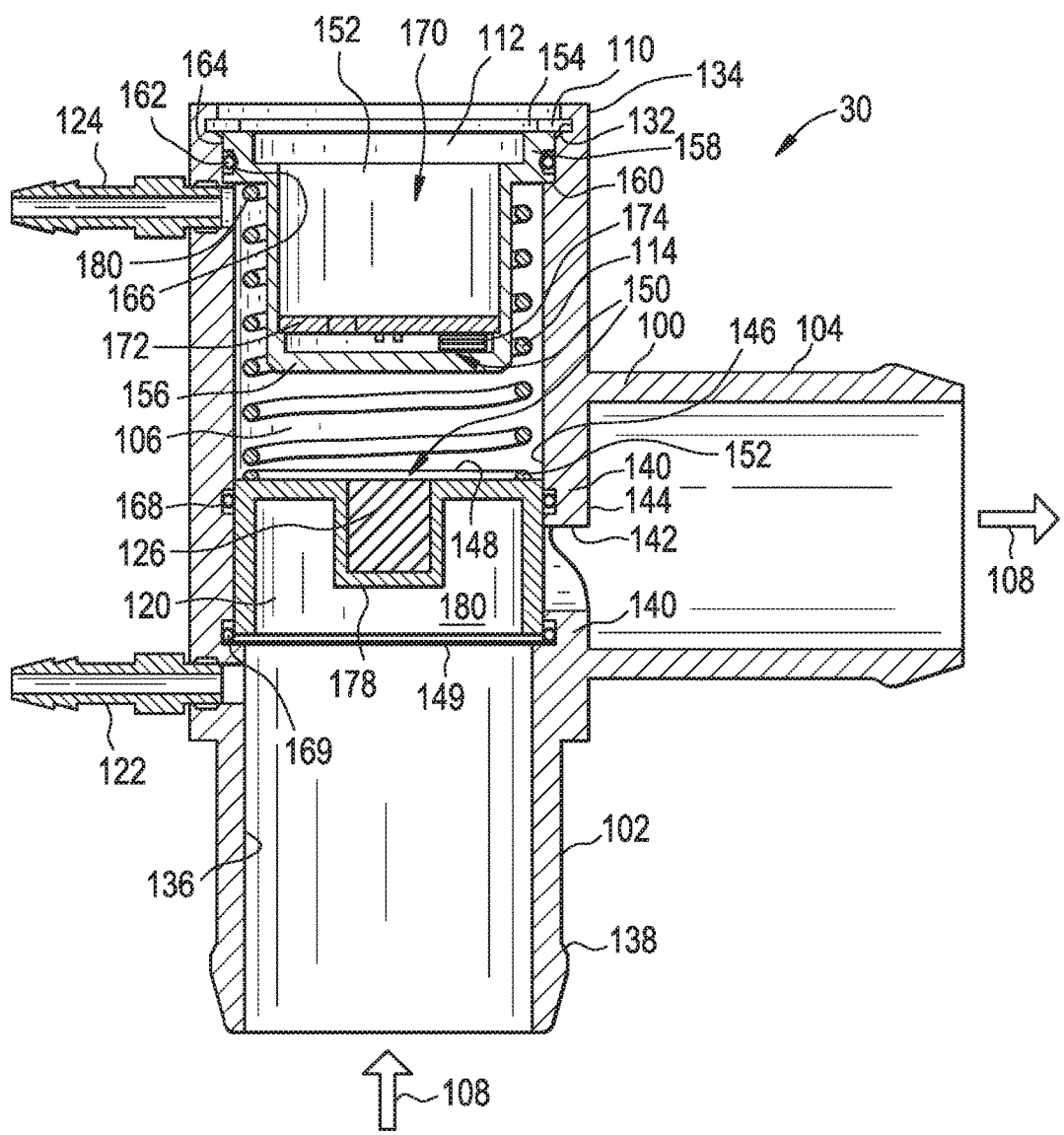
FIG. 3 is a cross-sectional view of the relief valve of FIG. 2 in the closed position.

Referring to FIGS. 2-3, the relief valve 30 may include a valve body 100 that defines an inlet port 102, an outlet port 104, and a pressurized chamber 106. In the exemplary embodiment as shown in FIGS. 2-3, the lower port is the inlet port 102, and the port located on the right hand side of the valve body 100 is the outlet port 106. However, it is to be understood that the direction of flow 108 may be reversed, and the port 102 may be used as an outlet port, and the port 104 may be used as an inlet port. The valve 30 may also include a snap ring 110, a cover 112, a biasing element 114, a piston 120, a vent fitting 122, a vent fitting 124, and a magnet 126. The snap ring 110 may define one or more eyelets 130 (FIG. 2). The snap ring 110 may be seated within an annular recess 132 located at a first end 134 of the valve body 100.

Figure 4:
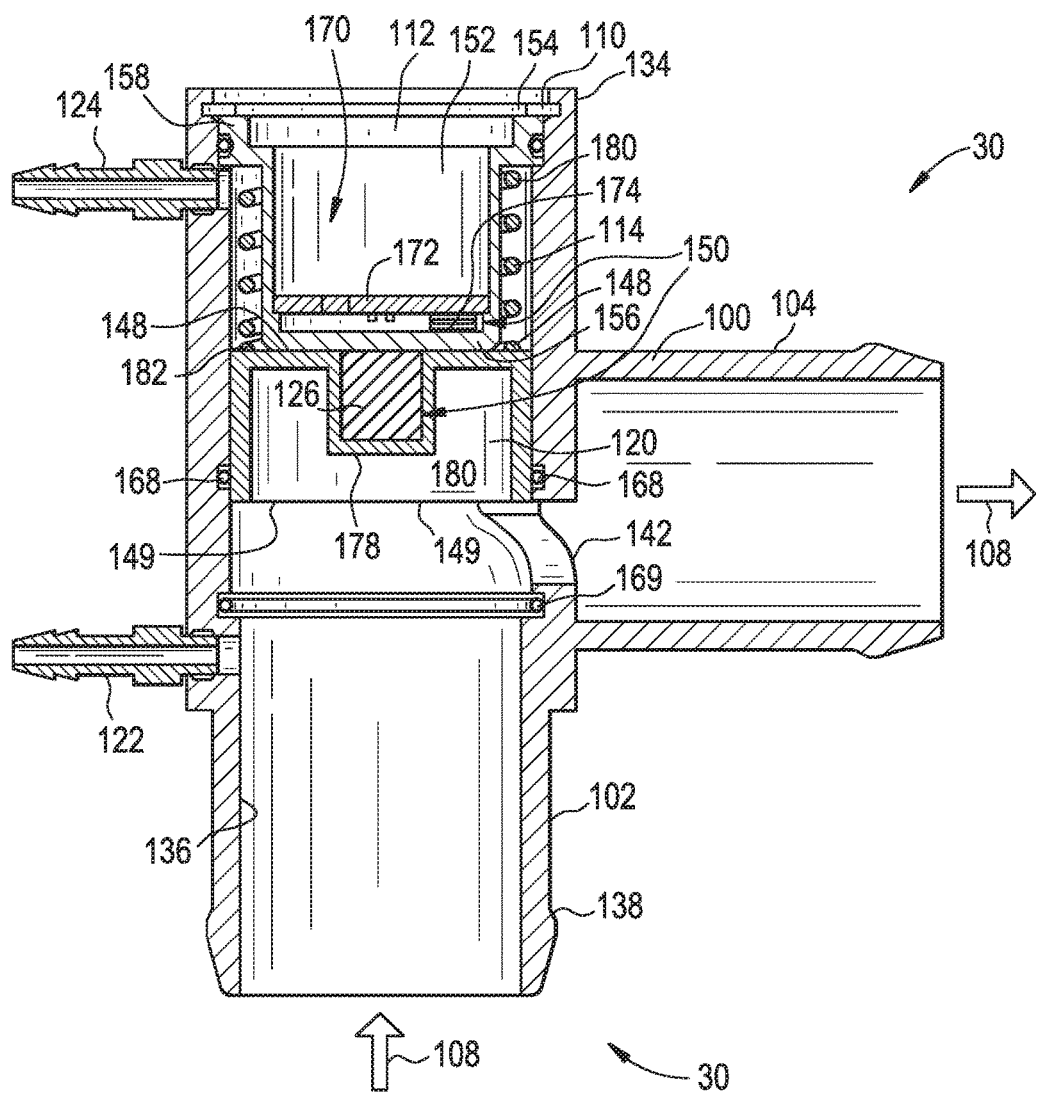
FIG. 4 is a cross-sectional view of the relief valve of FIG. 2 in an open position.

In the exemplary embodiment as shown in FIGS. 2-3, the valve body 100 may define a generally cylindrical chamber 136 extending between the first end 134 and a second end 138. The piston 120 may be sized to translate in a linear direction within the chamber 136 of the valve body 100. The piston 120 may also separate the inlet port 102 from the pressurized chamber 106. FIGS. 2-3 illustrate the valve 30 in a closed position, and FIGS. 4 and 6C illustrate the valve 30 in an open position. Specifically, the piston 120 may translate or move up and down incrementally within the cylindrical chamber 136 of the valve body 100. As best seen in FIG. 3, a metering or modulation orifice 142 may be defined by a generally cylindrical wall 140 that defines a portion of the chamber 136. The wall 140 may include a first side 144 and a second side 146. The first side 144 of the wall 140 may define a portion of the outlet port 104, and the second side 146 of the wall 140 may define a portion of the chamber 136.

The modulation orifice 142 may be used to selectively allow for a medium, such as fluid or gas, to flow from the inlet port 102 to the outlet port 104. The modulation orifice 142 may also be used to vary or modulate the amount of medium that passes from the inlet port 102 to the outlet port 104. Specifically, when the valve 30 is in the closed position (FIGS. 2-3 and 6A), the piston 120 may generally block or prevent a medium from flowing from the inlet port 102 to the outlet port 104. The piston 120 may be actuated into a plurality of partially opened positions (one of which is shown in FIG. 6B) in response to signals generated by a position sensor 150, which is described in greater detail below. The piston 120 is moveable within the chamber 136 of the valve 100 in a plurality of partially opened positions, which in turn varies the amount of medium that may flow through the modulation orifice 142. When the relief valve 30 is in the completely open position (FIG. 4), a medium may flow through the modulation orifice 142 without any substantial obstruction or blockage by the piston 120.

As best seen in FIGS. 3-4, the piston 120 may include an upper surface 148 and a lower surface 149. Two sealing members 168 and 169 may be seated within the cylindrical chamber 136 of the valve body 100. Specifically, if the relief valve 30 is in the closed position, the sealing member 168 may be aligned with and provide sealing between the pressurized chamber 106 of the valve body 100, the modulation orifice 142, and the piston 120. Likewise, the sealing member 169 may be aligned with and provide sealing between the inlet port 102 of the valve body 100, the modulation orifice 142, and the piston 120. The sealing members 168, 169 may be any type of seal for reciprocating components such as an O-ring.

In the exemplary embodiment as shown, the modulation orifice 142 includes a generally inverted triangular profile. Thus, as the piston 120 moves upwardly from the closed position (FIGS. 2-3) and into the open position (FIG. 4), the amount of flow passing through the modulation orifice 142 increases exponentially. In other words, as the lower surface 149 of the piston 120 is moved into the fully open position, the amount of flow through the modulation orifice 142 may increase at a faster rate. Although an inverted triangle is illustrated, those skilled in the art will readily appreciate that the modulation orifice 142 may take on a variety of different shapes and configurations in order to control the amount of flow. The shape of the modulation orifice 142 may depend upon a number of variables such as, but not limited to, noise (i.e., to control whistling through the valve 30) and the distance the piston 120 may travel within the cylindrical chamber 136 of the valve body 100. For example, in an alternative embodiment, the modulation orifice 142 may include a slotted or square configuration.

Referring to FIG. 3, the cover 112 may be located within the pressurized chamber 106 of the valve body 100. The cover 112 includes a body 152 having an open end 154 and a closed end 156. A lip or rim 158 may be located at the open end 154 of the body 152. The valve body 100 may define a shelf 160. The rim 158 of the cover 112 may be seated against the shelf 160 of the valve body 100. A sealing element 162 such as, for example, an O-ring may be interposed between a side surface 164 of the rim 158 and a side surface 166 of the valve body 100. The cover 112 provides sealing between the pressurized chamber 106 of the valve body 100 and the atmosphere.

The body 152 of the cover 112 also defines a recess 170. A controller 172 and the position sensor 150 may be located within the recess 170 of the cover 112, where the controller 172 is in signal communication with the position sensor 150. The controller 172 may refer to an application specific integrated circuit (ASIC), an electronic circuit, a processor (shared, dedicated, or group) and memory that executes one or more software or firmware programs, a combinational logic circuit, or other suitable components that provide the described functionality.

The position sensor 150 may be any device that permits position measurement. In one embodiment, position sensor 150 is a relative position sensor (a displacement sensor) based on movement of the piston 120 within the cylindrical chamber 136 of the valve body 100. The position sensor 150 may be a capacitive transducer, an eddy-current sensor, a grating sensor, a Hall effect sensor, an inductive non-contact position sensor, a laser Doppler Vibrometer (optical), a linear variable differential transformer (LVDT), a multi-axis displacement transducer, a photodiode array, a piezo-electric transducer (piezo-electric), a potentiometer, a proximity sensor (optical), a seismic displacement pick-up, a string potentiometer (also known as string pot., string encoder, cable position transducer), or a combination thereof.

In the embodiment illustrated, the position sensor 150 is a Hall effect sensor comprising a chip/Hall effect position sensor 174 that sensors the displacement of the magnet 126. The magnet 126 may be connected to the piston 120 for translation therewith. Specifically, the magnet 126 may be mounted to or placed within the piston 120. In FIGS. 3 and 4, the magnet 126 is housed within a bracket 178 formed by a piston body 180. The bracket 178 suspends the magnet 126 within the piston 120.

The chip/Hall effect position sensor 174 may be positioned within the valve body 100 in sufficient proximity to sense the movement of the magnet 126 located within the piston 120, and determine the specific position of the piston 120 within the chamber 136 of the valve body 100. In the embodiment as shown in FIGS. 3 and 4, the chip/Hall effect position sensor 174 is oriented horizontally in a position above the magnet 126 (i.e., axial relative to the magnet 126). In another embodiment, the chip/Hall effect position sensor 174 may be oriented vertically in a position radially outward away from the magnet 126.

The biasing element 114 may include a first end 180 and a second end 182. The first end 180 of the biasing element 114 may be seated against the rim 158 of the cover 112, and the second end 182 of the biasing element 114 may be seated against the upper surface 148 of the piston 120. The biasing element 114 may be used to exert an axial force against the upper surface 148 of the piston 120. In the non-limiting embodiment as shown, the biasing element 114 is a coil spring, however those skilled in the art will appreciate that any type of biasing element for exerting an axial force against the piston 120 may be used as well.

FIG. 5 is an illustration of the relief valve 30 and the solenoid 38. The solenoid 38 may be used to create a pressure differential within the relief valve 30, thereby causing the piston 120 to travel within the chamber 136 of the valve body 100. Although a solenoid is illustrated, those skilled in the art will appreciate that other devices may be used as well to create a pressure differential within the relief valve 30 such as, for example, a pump for moving fluid or gas in either a positive or a negative direction.

The controller 172 may be in signal communication with the solenoid 38 in order to turn on the solenoid 38 and to move an armature (not illustrated). Specifically, the controller 172 may control the solenoid 38 based on the current position of the piston 120 within the chamber 136. The movement of the armature of the solenoid 38 may create a pressure differential between the inlet port 102 and the pressurized chamber 106 of the valve body 100. The piston 120 may translate or move within the chamber 136 of the valve body 100 based on a pressure differential between the inlet port 102 and the pressurized chamber 106, which is described in greater detail below.

In the embodiment as shown in FIG. 5, the solenoid 38 may include a first vent port 190, a second vent port 194, and a vacuum port 196. The first vent port 190 of the solenoid 38 may be fluidly connected to the vent fitting 122 of the valve 30, and the second vent port 194 may be fluidly connected to the vent fitting 124 of the valve 30. In one embodiment, the first vent port 190 and the second vent port 194 may be fluidly connected to the relief valve 30 using a connection hose (not illustrated). FIG. 5 illustrates the valve 30 in the closed position, where the controller 172 may control the armature of the solenoid 38 (not illustrated) in order to open the first vent port 190 and close the vacuum port 196 to communicate pressure between the first vent port 190 and the second vent port 194. Thus, the pressure of the inlet port 102 is about equal to or balanced with the pressurized chamber 106 of the valve body 100. The axial force exerted by the biasing element 114 against the upper surface 148 of the piston 120 retains the piston 120 in place in the closed position within the chamber 136 of the valve body 100.

The controller 172 may control the solenoid 38 in order to create a pressure differential between the inlet port 102 and the pressurized chamber 106 of the valve body 100. Specifically, the controller 172 may control the armature of the solenoid 38 (not illustrated) in order to close the first vent port 190 and apply vacuum to the second vent port 194. Thus, the pressure of the inlet port 102 is no longer equal to the pressure located within the pressurized chamber 106 of the valve body 100. As a result, the piston 120 overcomes the axial force exerted by the biasing element 114, and the piston 120 may translate in an upward direction, and into the open position seen in FIG. 4. In one embodiment, the amount of vacuum applied to the second vent port 194 may be varied in order to control the position of the piston 120 within the chamber 136 of the valve body 100. In other words, the piston 120 may be positioned in one of the partially opened positions based on a predetermined amount of vacuum applied to the second vent port 194. In an alternative embodiment, the position of the piston 120 may be controlled using pulse width modulation (PWM) control. Specifically, the solenoid 38 may be modulated off and on using PWM control in order to position the piston 120 in one of the partially opened positions within the chamber 136 of the valve body 100.

Referring generally to the figures, the disclosed relief valve 30 includes a modulation orifice, which is used to vary the amount of medium that flows through the relief valve. Thus, referring specifically to FIG. 1, the relief valve 30 enables the control of an operating pressure of the exhaust manifold 40 on command. In particular, by partially opening the disclosed valve 30, the operating pressures in the exhaust manifold 40 may be controlled. Some types of compressor recirculation valves and blow-off valves currently available only have a fully open or a fully closed position. In contrast, the disclosed valve 30 may be opened into a plurality of positions, thereby allowing control of the operating pressure in the exhaust manifold 40 on command. This in turn will allow for more precise control of turbo speed. Moreover, turbo response time and turbo lag may be reduced. Finally, the disclosed relief valve 30 may also improve fuel economy as well as drivability of a vehicle.

The embodiments of this invention shown in the drawings and described above are exemplary of numerous embodiments that may be made within the scope of the appended claims. It is contemplated that numerous other configurations of the tensioner may be created taking advantage of the disclosed approach. In short, it is the applicant's intention that the scope of the patent issuing herefrom will be limited only by the scope of the appended claims.

What is claimed is:

1. A variable flow valve assembly, comprising:
a main body defining a chamber, an inlet port, an outlet port, and a wall located between the inlet port and the outlet port, the wall defining a modulation orifice for selectively allowing a medium to flow from the inlet port to the outlet port, wherein the chamber of the main body includes a pressurized chamber;
a vent fitting in open fluid communication with the inlet port,
a piston moveable within the chamber of the main body in a plurality of partially open positions to vary the amount of medium flowing through the modulation orifice, wherein the piston has a surface that defines one surface of the pressurized chamber and separates the pressurized chamber from fluid communication with the inlet port;
a position sensor for determining the position of the piston within the chamber of the main body;
a controller that is in signal communication with the position sensor; and
a solenoid in signal communication with the controller;
wherein the solenoid has a first vent port in fluid communication with the vent fitting, a second vent port in fluid communication with the pressurized chamber, and a vacuum port, wherein the first vent port and the vacuum port are in selective fluid communication with the second vent port;
wherein, with the piston in a closed position, the first vent port of the solenoid is open for fluid communication with the second vent port for the pressure of the inlet port to be balanced with the pressure of the pressurized chamber.

2. The variable flow valve assembly of claim 1, wherein the position sensor is a Hall effect sensor comprising a sensor chip that sensors the displacement of a magnet seated within the piston.

3. The variable flow valve assembly of claim 1, wherein the solenoid applies a predetermined amount of vacuum to the pressurized chamber, and wherein the predetermined amount of vacuum causes the piston to move into one of the plurality of open positions.

4. The variable flow valve assembly of claim 1, wherein the solenoid is modulated using pulse width modulation (PWM) control in order to position the piston in one of the partially opened positions within the chamber of the main body.

5. The variable flow valve assembly of claim 1, further comprising a biasing element that includes a first end and a second end, wherein the first end of the biasing element is seated against a cover, and the second end of the biasing element is seated against an upper surface of the piston.

6. The variable flow valve assembly of claim 1, wherein the modulation orifice includes a triangular, a slotted, or a rectangular configuration.

7. The variable flow valve assembly of claim 1, wherein the variable flow valve is one of a compressor recirculation valve and a blow-off valve.

8. The variable flow valve assembly of claim 1, wherein a side surface of the piston extending between the upper surface and a lower surface of the piston is linearly translated along the wall defining the modulation orifice to open, partially open, or fully block the modulation orifice.

9. The variable flow valve assembly of claim 8, wherein the piston is sized to translate a predefined distance within the chamber of the main body, and wherein a predefined shape of the modulation orifice is based at least in part by the predefined distance the piston travels within the chamber so as to partially cover the modulation orifice with the piston in the plurality of open positions.

10. The variable flow valve assembly of claim 1, wherein the modulation orifice has a generally triangular profile oriented for linear translation of the piston to cover the modulation orifice beginning at a base of the triangle and advancing toward an apex of the triangle to reach a closed position.

11. A system for controlling an exhaust driven turbocharging system, comprising:
  a turbocharger having a compressor inlet in fluid communication with a variable flow valve assembly and an intake manifold of an engine, the variable flow valve assembly comprising:
    a main body defining a chamber, an inlet port, an outlet port, and a wall located between the inlet port and the outlet port, the wall defining a modulation orifice for selectively allowing a medium to flow from the inlet port to the outlet port, wherein the chamber of the main body includes a pressurized chamber;
    a vent fitting in open fluid communication with the inlet port; and
    a piston moveable within the chamber of the main body in a plurality of partially open positions to vary the amount of medium flowing through the modulation orifice, wherein the piston has a surface that defines one surface of the pressurized chamber and separates the pressurized chamber from fluid communication with the inlet port;
  a position sensor for determining the position of the piston within the chamber of the main body;
  a controller that is in signal communication with the position sensor, wherein the position of the piston within the chamber is determined by the controller,
  a solenoid in signal communication with the controller wherein the solenoid has a first vent port in fluid communication with the vent fitting, a second vent port in fluid communication with the pressurized chamber, and a vacuum port, wherein the first vent port and the vacuum port are in selective fluid communication with the second vent port;
  wherein, the controller controls the solenoid to apply a predetermined amount of vacuum to the pressurized chamber that moves the piston to one of a plurality of open positions by closing the first vent port and opening the vacuum port to create a pressure differential between the inlet port and the pressurized chamber, thereby partially opening the metering orifice to communicate air to the intake manifold.

12. The system of claim 11, further comprising a biasing element that includes a first end and a second end, wherein the first end of the biasing element is seated against a cover, and the second end of the biasing element is seated against an upper surface of the piston.

13. The system of claim 11, wherein the modulation orifice includes a triangular, a slotted, or a rectangular configuration.

14. The system of claim 11, wherein the variable flow valve assembly is a compressor recirculation valve that is fluidly connected to and vents compressed air back into the compressor inlet.

15. The system of claim 11, wherein the variable flow valve is one of a compressor recirculation valve and a blow-off valve.

16. The system of claim 11, wherein a side surface of the piston extending between the upper surface and a lower surface of the piston is linearly translated along the wall defining the modulation orifice to open, partially open, or fully block the modulation orifice.

17. The system of claim 16, wherein the piston is sized to translate a predefined distance within the chamber of the main body, and wherein a predefined shape of the modulation orifice is based at least in part by the predefined distance the piston travels within the chamber so as to partially cover the modulation orifice with the piston in the plurality of open positions.

18. The system of claim 11, wherein the modulation orifice has a generally triangular profile oriented for linear translation of the piston to cover the modulation orifice beginning at a base of the triangle and advancing toward an apex of the triangle to reach a closed position.

* * * * *